United States Patent
Ricketts et al.

(10) Patent No.: US 9,119,349 B2
(45) Date of Patent: Sep. 1, 2015

(54) CONCAVE WITH CROP GUIDANCE FEATURES

(71) Applicants: Jonathan Eugene Ricketts, Coal Valley, IL (US); Wayne T Flickinger, Oxford, PA (US); Joshua D Werning, Mount Wolf, PA (US)

(72) Inventors: Jonathan Eugene Ricketts, Coal Valley, IL (US); Wayne T Flickinger, Oxford, PA (US); Joshua D Werning, Mount Wolf, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/724,843

(22) Filed: Dec. 21, 2012

(65) Prior Publication Data

US 2014/0174049 A1 Jun. 26, 2014

(51) Int. Cl.
*A01F 12/24* (2006.01)
*A01F 12/26* (2006.01)

(52) U.S. Cl.
CPC ..................... *A01F 12/26* (2013.01)

(58) Field of Classification Search
CPC ....... A01F 12/24; A01F 12/26; A01F 12/442; A01F 12/18; A01F 12/28; A01F 11/06; A01F 7/06
USPC ............. 460/108, 107, 46, 66, 45, 39, 59, 69; 241/101.5, 241, 88.4, 89.3; 56/14.6
See application file for complete search history.

(56) References Cited

U.S. PATENT DOCUMENTS

| | | | |
|---|---|---|---|
| 70,195 A | 10/1867 | Goewey | |
| 132,017 A | 10/1872 | Miller | |
| 318,825 A | 5/1885 | Strobel | |
| 2,457,259 A | 12/1948 | Moll | |
| 2,457,680 A * | 12/1948 | Johnson | 460/110 |
| 2,771,077 A * | 11/1956 | Karlsson et al. | 460/108 |
| 3,297,037 A | 1/1967 | Ausherman | |
| 3,401,727 A | 9/1968 | Blanshine et al. | |
| 3,439,684 A * | 4/1969 | Rathje et al. | 460/110 |
| 3,515,145 A | 6/1970 | Herbsthofer | |
| 4,078,571 A * | 3/1978 | Todd et al. | 460/66 |
| 4,192,322 A * | 3/1980 | Wilson | 460/70 |
| 4,258,726 A * | 3/1981 | Glaser et al. | 460/109 |
| 4,383,652 A * | 5/1983 | Osborne et al. | 241/88.4 |
| 4,706,690 A * | 11/1987 | Huhman | 460/84 |
| 4,919,641 A * | 4/1990 | Yarmashev et al. | 460/69 |
| 5,569,080 A * | 10/1996 | Estes | 460/72 |
| 5,816,911 A | 10/1998 | Dwyer | |

(Continued)

FOREIGN PATENT DOCUMENTS

| | | |
|---|---|---|
| BE | 692536 A | 6/1967 |
| FR | 2570573 A | 3/1986 |
| FR | 910279 A | 5/2011 |

*Primary Examiner* — Árpád Fábián-Kovács
(74) *Attorney, Agent, or Firm* — Patrick M. Sheldrake; Seyed V. Sharifi T.

(57) ABSTRACT

A concave for a harvester combine is provided, the concave comprising a first longitudinal member comprising a plurality of first longitudinal member wire guide grooves substantially at the same height position relative to a bottom of the first longitudinal member; a second longitudinal member comprising a plurality of second longitudinal member wire guide grooves substantially at the same height position relative to a bottom of the second longitudinal member; a first transverse member and a second transverse member substantially parallel to one another affixed to the first longitudinal member and the second longitudinal member; and a plurality of module members affixed to the first and second transverse members.

15 Claims, 6 Drawing Sheets

(56) References Cited

U.S. PATENT DOCUMENTS

| | | |
|---|---|---|
| 5,885,155 A | 3/1999 | Dwyer et al. |
| 6,193,604 B1 * | 2/2001 | Ramp et al. .................... 460/110 |
| 6,358,142 B1 * | 3/2002 | Imel et al. ..................... 460/109 |
| 6,447,394 B1 * | 9/2002 | Gryspeerdt .................... 460/109 |
| 6,503,142 B2 * | 1/2003 | Imel et al. ..................... 460/107 |
| 6,537,148 B2 | 3/2003 | Schwersmann |
| 7,285,043 B2 * | 10/2007 | Foster et al. ................... 460/110 |
| D624,939 S * | 10/2010 | Flickinger et al. ............. D15/28 |
| 8,313,361 B2 * | 11/2012 | Flickinger et al. ............. 460/110 |
| 8,454,416 B1 * | 6/2013 | Estes ............................ 460/110 |
| 8,690,652 B1 * | 4/2014 | Estes ............................ 460/110 |

* cited by examiner

CONCAVE WITH CROP GUIDANCE FEATURES

TECHNOLOGY FIELD

The present invention relates generally to harvesters, such as combine harvesters, and concaves used therein, and more particularly, an improved easy flow concave.

BACKGROUND

A combine harvester is a machine that is used to harvest grain crops, such as wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester uses a number of combine components/systems during harvesting. A cutting system cuts the crop using a wide cutting header. The cut crop is picked up and moved from outer areas of the header toward the center area of the header using an auger or belt system and conveyed to a feeder system. The cut crop is then fed by the feeding system into the threshing and separating mechanism of the combine for separating the grains from material other than grain (MOG). The cut crop is feed through, in part, by a concave that helps guide the cut crop into and around the threshing rotor. The MOG is expelled out of the rear of the combine, while the grain, chaff, and other small debris fall through concaves and grates onto a cleaning device or shoe, where it is further separated from the chaff by way of a winnowing process. Clean grain is transported to a grain tank in the combine for temporary storage. The grain tank is typically located atop the combine and loaded via a conveyer that carries clean grain collected in the cleaning system to the grain tank. The grain may then be unloaded through a conveying system to a support trailer or vehicle, allowing large quantities of grain to be unloaded in the field without needing to stop harvesting when the grain tank fills.

Conventional concaves do not provide any substantial rearward motion to continuously feed the crop through the combine.

SUMMARY

Embodiments of the present invention address and overcome one or more of the above shortcomings and drawbacks, by providing concaves for combine harvesters so that crop material is more efficiently transported through the combine. This technology is particularly well-suited for, but by no means limited to, combine harvesters.

In some embodiments, a combine for a combine harvester is provided. In some embodiments, the concave comprises a first longitudinal member comprising a plurality of first longitudinal member wire guide grooves substantially at the same height position relative to a bottom of the first longitudinal member; a second longitudinal member comprising a plurality of second longitudinal member wire guide grooves substantially at the same height position relative to a bottom of the second longitudinal member; a first transverse member and a second transverse member substantially parallel to one another affixed to the first longitudinal member and the second longitudinal member; and; a plurality of module members affixed to the first and second transverse members. In some embodiments, the module members comprise a plurality of module member wire guide grooves, wherein at least two of the plurality of modular member wire guide grooves are at different height positions relative to the bottom of the first longitudinal member, a plurality of channels defined between the module member wire guide grooves, wherein a bottom edge of at least two of the plurality of channels have different heights relative to a bottom edge of the longitudinal members, wherein the plurality of channels are not parallel to the transverse members.

In some embodiments, the concave comprises a plurality of wires attached to the channels. In some embodiments, the wires are affixed to the first longitudinal member wire guide grooves. In some embodiments, the grooves are below the top surface of the first longitudinal member.

In some embodiments, a combine harvester comprising a rotor and a concave described herein is provided. In some embodiments, the longitudinal member of the concave is substantially parallel to the rotational axis of the rotor.

In some embodiments, methods of processing an agricultural crop in an agricultural crop harvesting machine are provided. In some embodiments, the method comprises harvesting a grain-bearing crop from the soil; directing the harvested crop to a harvesting machine comprising a concave described herein; feeding the crop between a housing and an infeed section of a rotor in the harvesting machine, said infeed section engaging the harvested crop and directing the harvested crop toward a threshing section of the rotor; threshing the harvested crop in the threshing section crop processing unit to separate the grain from the crop, wherein the concave directs the crop toward the rear of the threshing section and directing the remainder of the harvested crop out of the rear of the harvesting machine.

In some embodiments, methods of threshing and separating the grain from the MOG are provided. In some embodiments, the method comprises passing crop material through a combine comprising a concave described herein, and threshing and separating the grain of the crop material from the MOG. In some embodiments, the concave applies rearward pressure to the crop material forcing the crop material from the front end to the rear end of the concave.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1:
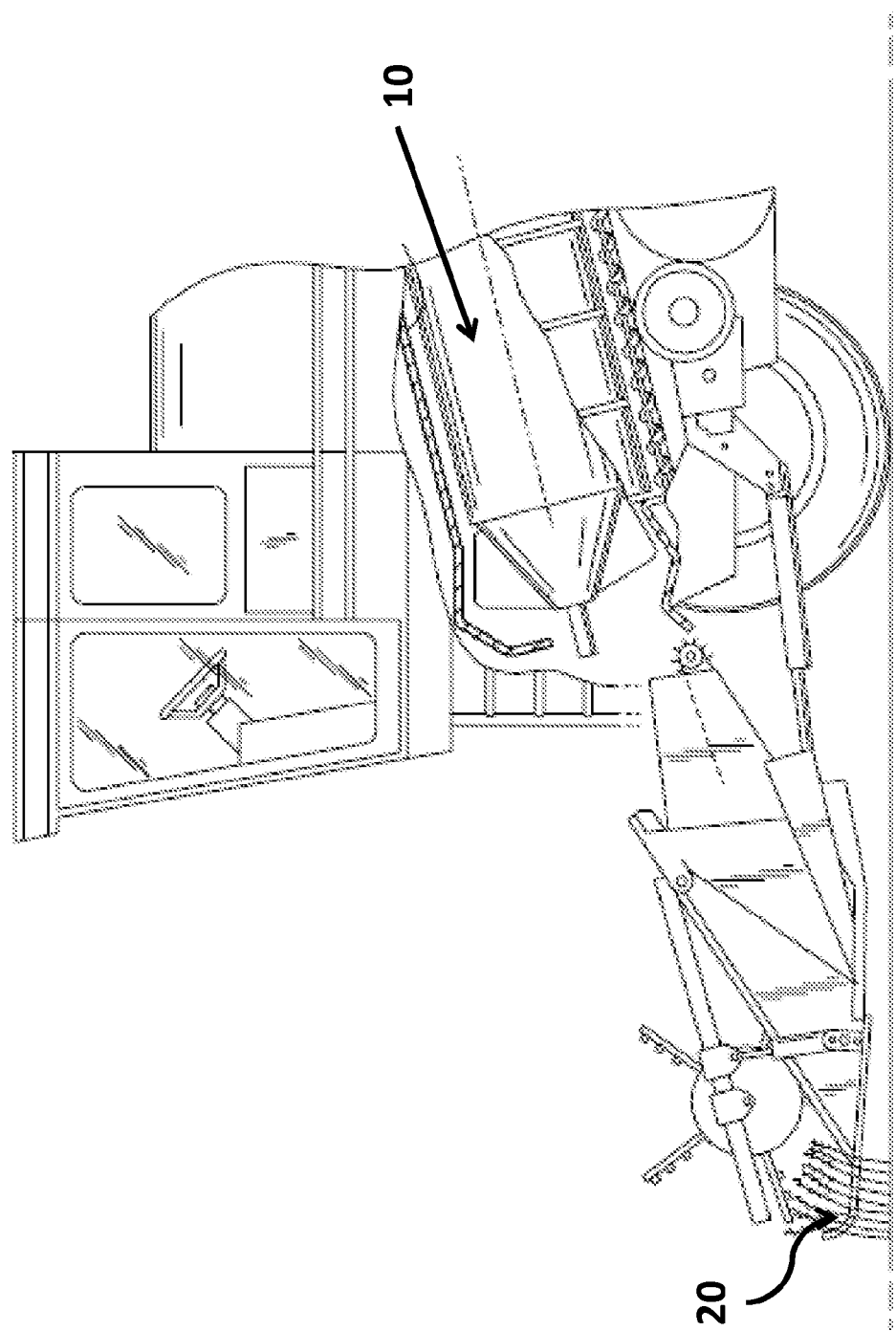
FIG. 1 illustrates a side view of an exemplary combine harvester that can be used with embodiments of the present invention.

A concave helps guide crop material through the combine and allowing the grain, chaff, and other small debris to fall through the concave's grates onto a cleaning device or shoe, where it may be further separated from the chaff by way of a winnowing process. As a result, the MOG must be forced up against the concave and due to the shape and nature of the concave can be an inefficient process. What is needed is a more effective concave that can help guide MOG and other materials around the threshing chamber.

This invention relates to a concave that can be used in a combine harvester and be part of, for example, the threshing mechanism of the combine in which the rotor rotates relative to the concave. This helps effectuate the threshing of the crop material that passes between the rotor and the concave. Accordingly, embodiments described herein provide a concave for a combine harvester.

In some embodiments, the concave comprises a first longitudinal member comprising a plurality of first longitudinal member wire guide grooves substantially at the same height position relative to a bottom of the first longitudinal member; a second longitudinal member comprising a plurality of second longitudinal member wire guide grooves substantially at the same height position relative to a bottom of the second longitudinal member; a first transverse member and a second transverse member substantially parallel to one another affixed to the first longitudinal member and the second longitudinal member; and a plurality of module members affixed to the first and second transverse members, wherein the module members comprise a plurality of module member wire guide grooves, wherein at least two of the plurality of modular member wire guide grooves are at different height positions relative to the bottom of the first longitudinal member, a plurality of channels defined between the module member wire guide grooves, wherein a bottom edge of at least two of the plurality of channels have different heights relative to a bottom edge of the longitudinal members, wherein the plurality of channels are not parallel to the transverse members. In some embodiments, the plurality of channels may be referred to as diagonal.

As used herein, the phrase "wire guide grooves" whether used in regards to the module members, the longitudinal members, or the transverse members can refer to both a groove that allows the wire to sit in the groove or refers to a place to which the wire is affixed to. The wire can be permanently affixed to the wire guide groove or temporarily affixed to the wire guide groove. That is, the groove can also be referred to as a place of attachment for the wire. As used herein, the terms "longitudinal" and "transverse" are used in conjunction with certain members of the concave. These terms are used in reference to how the members would sit in relationship to the axis of a rotor that is present in a combine. For example, a longitudinal member means that the longest side of the member is parallel or substantially parallel to axis of the rotor. For example, transverse member 130 shown in FIG. 4 has its longest side that is transverse (e.g., perpendicular or substantially perpendicular) to the axis of the rotor. In contrast, the longitudinal member 140 shown in FIG. 4 would have its longest side parallel or substantially parallel to the axis of the rotor. The names of the members are not significant, but rather how they form the concave and how their special relationship with the axis of the rotor that the concave would be used in conjunction with in a combine.

In some embodiments, the concave comprises a plurality of wires attached to the channels. The wires can be made of any suitable material that can feed the MOG and grain around the cylinder. For example, but not limited to, the wire can be a low carbon steel wire. In some embodiments, the wires are affixed to the wire guide grooves. The wires can be affixed at various points along the grooves that are defined by the module members. The wires can also be affixed to the one or both of the longitudinal members, the transverse members, the module members, or any combination thereof. For example, depending on where the wire is started, the wire may be affixed to one or more module members, but not to both longitudinal members or the transverse members. In some embodiments, the wire may be attached to the first longitudinal member, one or more module members, and one or more transverse members. The geometry and angle of the grooves defined by the module members will dictate where the wires are affixed and can be easily adjusted.

In some embodiments, the wire is flexible to adjust the various heights of the module members as the wire is placed in the channel defined by the module members. In some embodiments, if one continuous wire is used the wire is sufficiently flexible to change heights without breaking. In other embodiments, where one continuous wire is not used, multiple segments of wire material can be used so that the wire can follow the contour of the concave that is defined by the module members. Non-limiting examples of different contours can be seen in the accompanying figures.

In some embodiments, the first longitudinal member wire guide grooves are at a height position lower than the plurality of module member wire guide grooves. For example, the wire has an increasing slope as it goes from the front end member to the first transverse member. In some embodiments, the wire is affixed to the first longitudinal member at position that is lower than the upper surface of the first longitudinal member. The same can also be applied to the second longitudinal member.

In some embodiments, the first and second transverse members comprise a plurality of slots, wherein the plurality of module members are inserted into the plurality of the slots. Similarly to the wires, the module members can be made of any suitable material. For example, the module members can be, but not limited to, medium carbon steel module members. In some embodiments, the module members are interchangeable. In such embodiments, the module members can be taken out of the concave. This allows the pattern of the grooves to be different depending upon the type of crop that is being processed by, for example, a combine harvester. The interchangeable module members can be affixed to the transverse members. In some embodiments, the module members may be permanently attached to the transverse members such that the module members would no longer be easily interchangeable and would require replacing the concave if a change in the geometry of the module members would be required. If the module members are not permanently affixed to the transverse members the module members can be attached using any known method of attachment, such as, but not limited to, a bolt, screw, or just being tightly inserted into the slot without any other type of attachment member.

Embodiments described herein also provide a combine harvester comprising a rotor and a concave described herein.

In some embodiments, a method is provided for separating crop material. In some embodiments, the method comprises transporting crop material across the concave. The concaves as described herein can apply rearward pressure or movement to the crop material. This rearward pressure or force can assist in moving the crop material from the front end to the rear end of the threshing chamber. Without wishing to be bound to any theory, the rearward pressure may be applied via the different contours of the wire, which creates friction as the crop material is moved from the front end to the rear end. The contours are not as smooth as previously used concaves, and, therefore, the crop material will not slip down the concave as it moves from the front end to the rear end as with previous concaves. Although the concave is not applying force directly through any mechanical action, the shape of the concave will affect the crop material as if rearward force is being applied because there will be less slippage.

The concave also increases separation of the material. This increase in separation can be achieved, for example, without increasing the diameter of the concave due to the benefits and advantages of the concaves described herein. Without being bound to any particular theory, the separation is enhanced by the pressure that is applied by the concave.

In some embodiments, a method of processing an agricultural crop is provided. In some embodiments, the method comprises harvesting a grain-bearing crop from the soil and directing the harvested crop to a harvesting machine (e.g., combine harvester) comprising a concave described herein. In some embodiments, the method comprises feeding the crop between a housing and an infeed section of a rotor in the harvesting machine, wherein the infeed section engages the harvested crop and directs the harvested crop toward a threshing section of the rotor. In some embodiments, the method comprises threshing the harvested crop in the threshing section crop processing unit to separate the grain from the crop, wherein the threshing section comprises a concave described herein. In some embodiments, the concave directs the threshed crop toward the rear of the threshing section and directing the remainder of the harvested crop out of the rear of the harvesting machine. As described above, in some embodiments, the concave applies rearward pressure to the crop material forcing the crop material from the front end to the rear end of the concave due to its structure.

In some embodiments, a method of threshing and separating the grain from the MOG is provided. In some embodiments, the method comprises passing the crop material through a combine comprising a concave described herein. The grain can be separated from the MOG more efficiently with the presently described concaves. The combine can be used with different concaves that have different profiles and can be adapted to different crop materials. The concaves can be adapted to different crop materials by, for example, changing the module members for a particular crop. In some embodiments, the crop material is corn, wheat or soybeans. The lists of crops is non-limiting and the concave can be used with any crop that can be threshed and separated using a combine.

FIG. 1 illustrates a non-limiting example of a combine harvester that can comprise a concave as described herein. FIG. 1 shows a cut away view of the rotor 10, which according to some embodiments, the concave 100 (not visible) would be adjacent to. FIG. 1 illustrates a crop 20 being processed by the harvester. The crop will travel towards the rotor 10 and the concave.

Figure 2:
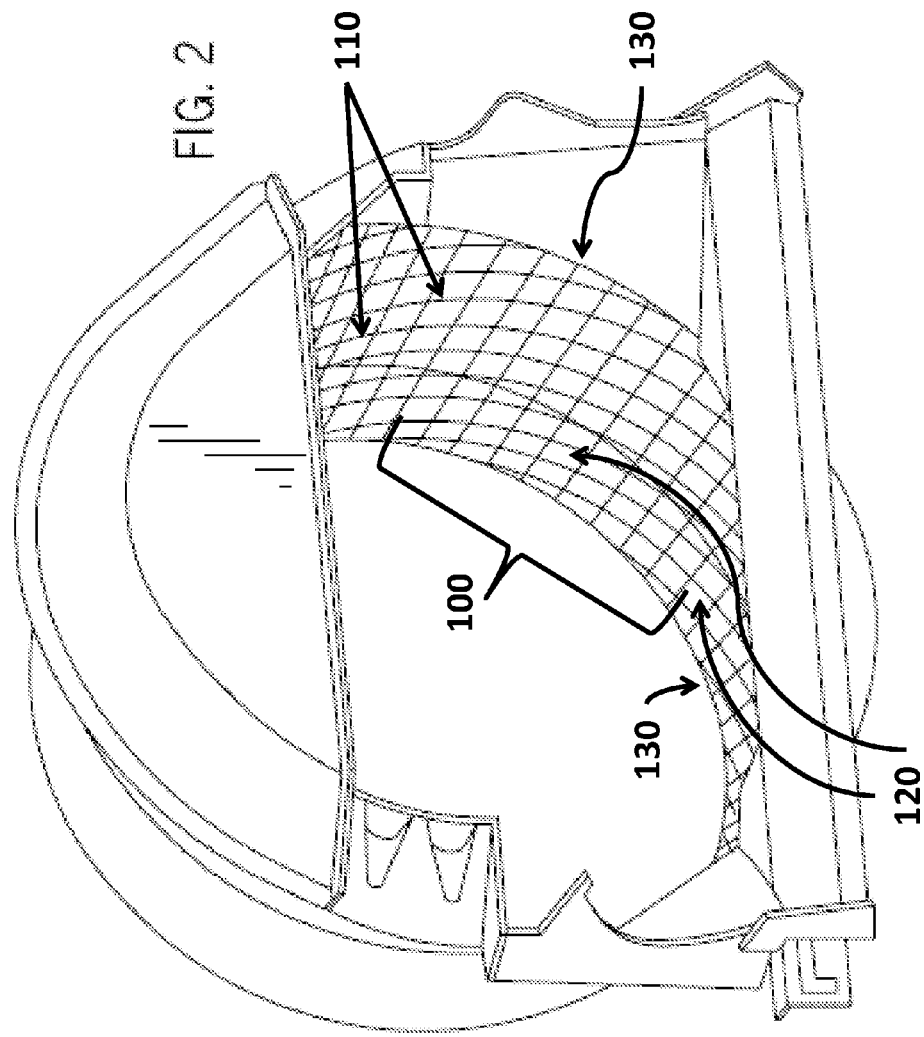
FIG. 2 illustrates a side view of an exemplary concave inside a threshing chassis.

FIG. 2 illustrates an isometric view of an exemplary concave 100 inside of a threshing mechanism 10 of a combine. The concave 100 shown at FIG. 2 includes a plurality of wires 110 defining a plurality of channels 120. The concave 100 shown at FIG. 2 also illustrates the transverse members 130. As discussed herein, the term transverse member means that that the member is transverse (e.g., perpendicular) in relation to the axis of the rotor. Not visible are the first and second longitudinal members of the concave 100.

Figure 3:
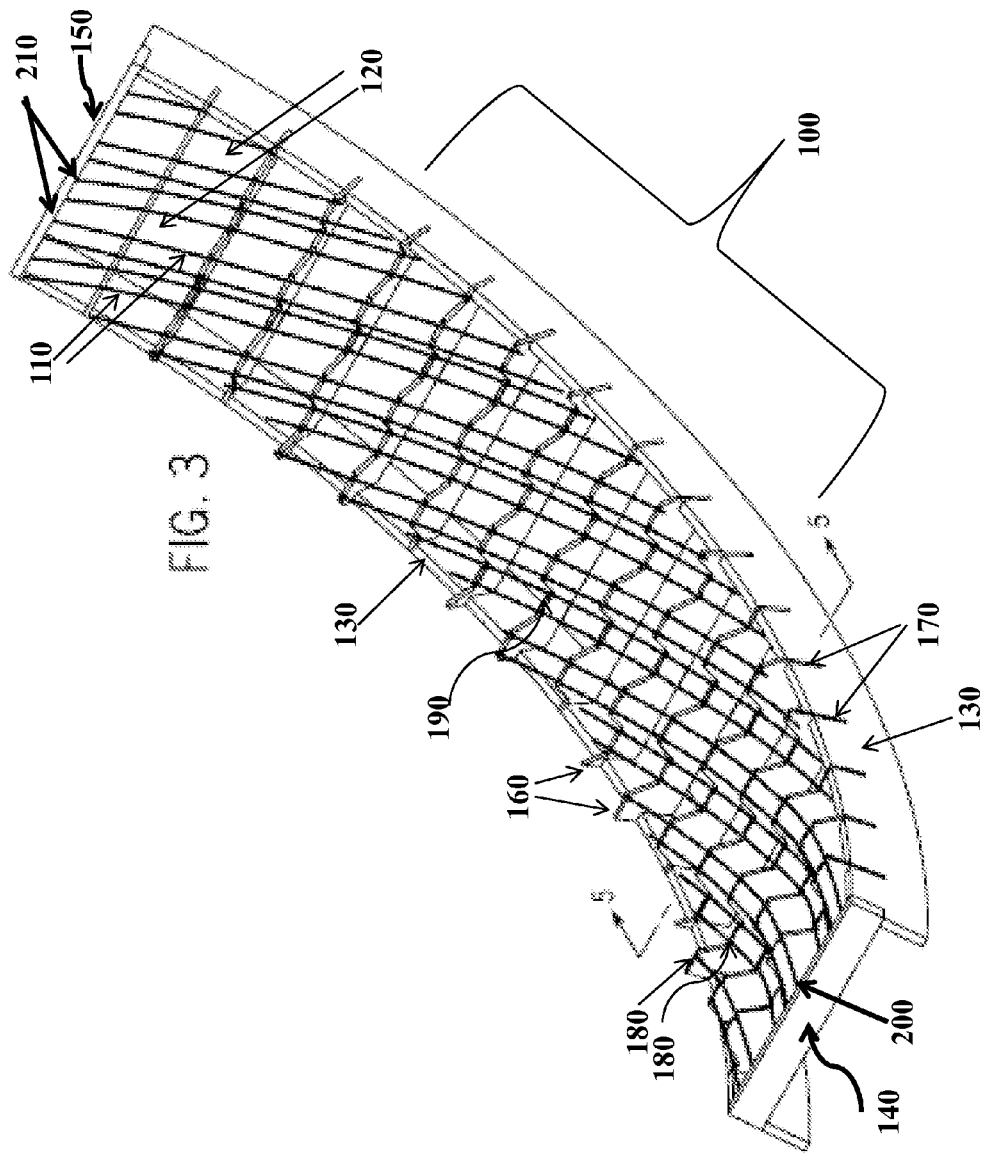
FIG. 3 illustrates an exemplary concave as described in various embodiments of the present invention.

FIG. 3 illustrates an isolated concave 100 that is removed from the combine according to some embodiments of the invention. The transverse members 130 are shown at FIG. 3. FIG. 3 illustrates that the transverse members 130 can be substantially parallel to one another. FIG. 3 also shows a first longitudinal member 140, a second longitudinal member 150, and a plurality of module members 160. The module members 160 are shown affixed to the transverse members in notches 170 that allow the module members to be interchangeable, if that is required for operation. FIG. 3 also illustrate the plurality of wires 110 defining a plurality of channels 120. The channels can be seen as not being parallel to the transverse members. The wires define the non-parallel channels by being affixed to the wire grooves 180. FIG. 3 also illustrates a plurality of module member wire guide grooves 180 at different height positions relative to the bottom of the first longitudinal member. FIG. 3 also illustrates a bottom edge 190 of a least two of the plurality of channels having different heights relative to a bottom edge of the module members. FIG. 3 also illustrates the first longitudinal member wires grooves 200 (i.e. where the wires are affixed to the first longitudinal member being at the same height position relative to the bottom of first longitudinal member). Rear wire grooves 210 present on the second longitudinal member are also exemplified at FIG. 3.

Figure 4:
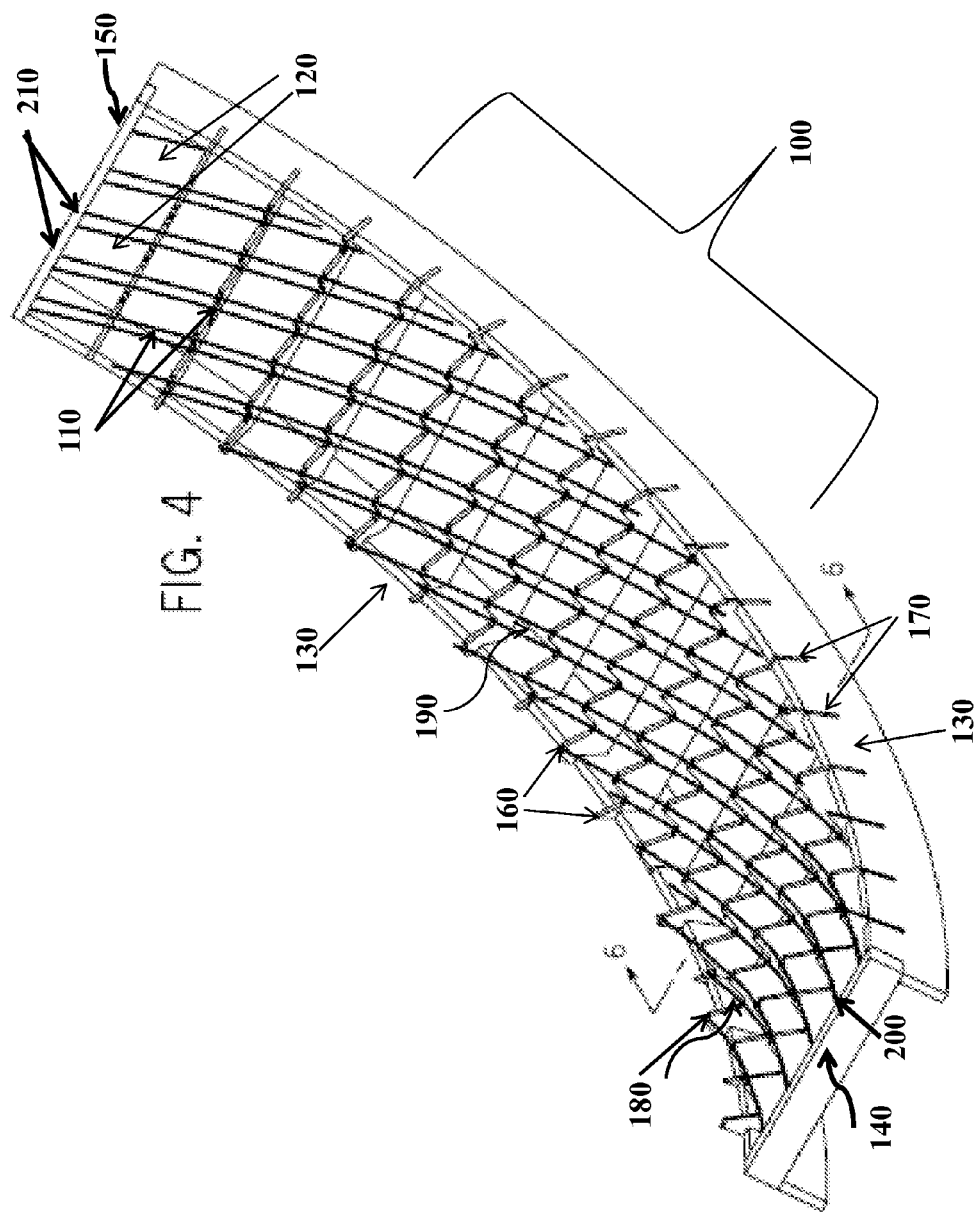
FIG. 4 illustrates an exemplary concave as described in various embodiments of the present invention.

FIG. 4 illustrates an isolated concave 100 that is removed from the combine according to some embodiments of the invention. The transverse members 130 are shown at FIG. 4. FIG. 4 illustrates that the transverse members 130 can be substantially parallel to one another. FIG. 4 also shows a first longitudinal member 140, a second longitudinal member 150, and a plurality of module members 160. The module members 160 are shown affixed to the transverse members in notches 170 that allow the transverse members to be interchangeable, if that is required for operation. FIG. 4 also illustrate the plurality of wires 110 defining a plurality of channels 120. The wires define the channels by being affixed to the wire grooves 180. FIG. 4 also illustrates a plurality of module member wire guide grooves 180 at different height positions relative to the bottom of the first longitudinal member. FIG. 4 also illustrates a bottom edge 190 of a least two of the plurality of channels having different heights relative to a bottom edge of the module members. FIG. 4 also illustrates the first longitudinal member wires grooves 200 (i.e., where the wires are affixed to the front end being at the same height position relative to the bottom of the first longitudinal member). Rear wire grooves 210 present on the second longitudinal member are also exemplified at FIG. 4. Module members 160 are shown at FIG. 4 with a different contours as those shown in FIG. 3. The different contours of the module members 160 in FIG. 3 and FIG. 4 can be used to modify the contours of the channels that the grooves and the wires define.

Figure 5:
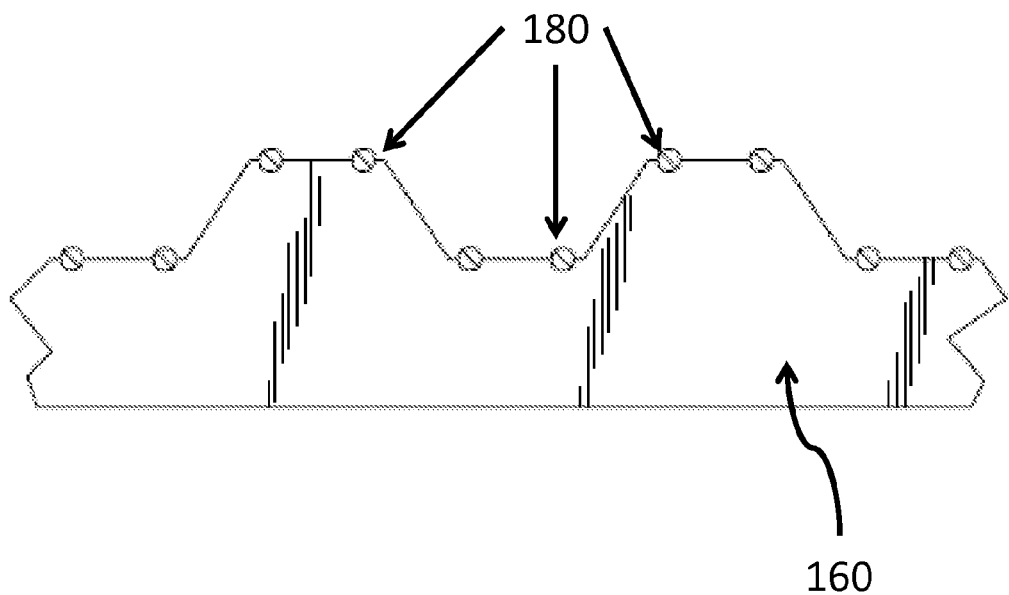
FIG. 5 illustrates a cross-sectional view of an exemplary concave as described in various embodiments of the present invention.

FIG. 5 shows a cross-sectional view of the embodiment of a concave of FIG. 3 showing a module member 160. Module member wire grooves 180 are also shown at FIG. 5. By being affixed to the different grooves the wires are shown at different height positions. FIG. 5 also illustrates the module members comprising a plurality of module member wire guide grooves, wherein at least two of the plurality of module member wire guide grooves are at different height positions. FIG. 5 also illustrates, according to one embodiment, the contour that is generated by the different height positions of the wire guide grooves.

Figure 6:
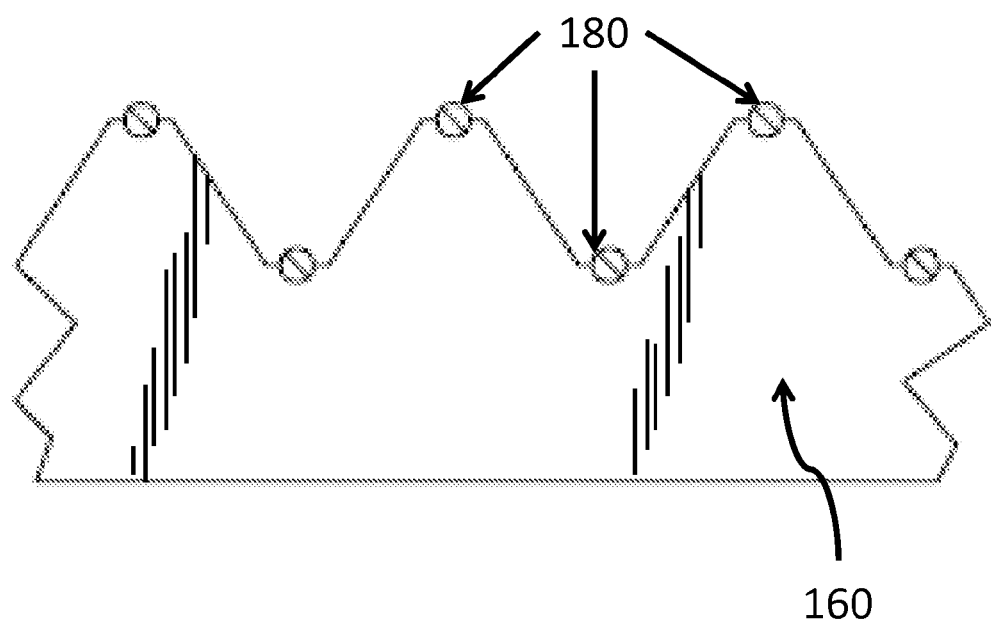
FIG. 6 illustrates a cross-sectional view of an exemplary concave as described in various embodiments of the present invention.

FIG. 6 shows a cross-sectional view of the embodiment of a concave of FIG. 4 showing a module member 160. Module member wire grooves 180 are also shown at FIG. 6. By being affixed to the different grooves the wires are shown at different height positions. FIG. 6 also illustrates the module members comprising a plurality of module member wire guide grooves, wherein at least two of the plurality of module member wire guide grooves are at different height positions. FIG. 6 also illustrates, according to one embodiment, the contour that is generated by the different height positions of the wire guide grooves.

Different non-limiting embodiments of module members can be seen in the cross-sectional views that are shown in FIG. 5 and FIG. 6. A comparison of the contours shown in FIG. 5 and FIG. 6 illustrate that the height positions and spacing of the wire guide grooves can be altered to change the contour of the concave.

Although the invention has been described with reference to exemplary embodiments, it is not limited thereto. Those skilled in the art will appreciate that numerous changes and modifications may be made to the disclosed embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A concave for a combine harvester, the concave comprising:
   a first longitudinal member comprising a plurality of first longitudinal member wire guide grooves substantially at the same height position relative to a bottom of the first longitudinal member;
   a second longitudinal member comprising a plurality of second longitudinal member wire guide grooves substantially at the same height position relative to a bottom of the second longitudinal member;
   a first transverse member and a second transverse member substantially parallel to one another affixed to the first longitudinal member and the second longitudinal member; and;
   a plurality of module members affixed to the first and second transverse members,
   wherein the module members comprise a plurality of module member wire guide grooves, wherein at least two of the plurality of modular member wire guide grooves are at different height positions relative to the bottom of the first longitudinal member,
   a plurality of channels defined between the module member wire guide grooves,
   wherein a bottom edge of at least two of the plurality of channels have different heights relative to a bottom edge of the longitudinal members,
   wherein the plurality of channels are not parallel to the transverse members.

2. The concave of claim 1, further comprising a plurality of wires attached to the channels.

3. The concave of claim 2, wherein the wires are affixed to the first longitudinal member wire guide grooves.

4. The concave of claim 3, wherein the grooves are below the top surface of the first longitudinal member.

5. The concave of claim 2, wherein each wire is affixed to one or more of the module member wire guide grooves and is affixed to one or more of the first longitudinal member, the second longitudinal member, the first transverse member, and the second transverse member.

6. The concave of claim 1, wherein the first longitudinal member wire guide grooves are at a height position lower. than the plurality of module member wire guide grooves.

7. The concave of claim 1, wherein the first and second transverse members comprise a plurality of slots, wherein the plurality of module members are inserted into the plurality of the slots.

8. The concave of claim 1, wherein the module members are interchangeable.

9. The concave of claim 2, wherein the plurality of wires attached to the first longitudinal member or the second longitudinal member are attached at the same plane.

10. The concave of claim 2, wherein the plurality of wires attached to the first or second transverse members are attached at the same plane.

11. The concave of claim 2, wherein the plurality of wires form a helical pattern.

12. The concave of claim 2, wherein the plurality of wires are equally spaced apart.

13. A combine harvester comprising a rotor and the concave of claim 1, wherein the longitudinal member is substantially parallel to the rotational axis of the rotor.

14. The combine harvester of claim 13, wherein the first and second transverse members are substantially perpendicular to the rotational axis of the rotor.

15. The combine harvester of claim 13, wherein the combine comprises a threshing chamber, the chamber comprising the concave.

* * * * *